US010956496B2

(12) United States Patent
Greenberg et al.

(10) Patent No.: US 10,956,496 B2
(45) Date of Patent: Mar. 23, 2021

(54) SYSTEMS AND METHODS FOR RETRIEVING DATA UTILIZING A SOCIAL INTELLIGENCE FUSION TOOLKIT (SIFT)

(71) Applicant: ALQIMI Analytics & Intelligence, LLC, Rockville, MD (US)

(72) Inventors: Walter Greenberg, Rockville, MD (US); Kevin M. Donohue, Rockville, MD (US)

(73) Assignee: ALQIMI ANALYTICS & INTELLIGENCE, LLC, Rockville, MD (US)

( * ) Notice: Subject to any disclaimer, the term of this patent is extended or adjusted under 35 U.S.C. 154(b) by 1132 days.

(21) Appl. No.: 15/224,481

(22) Filed: Jul. 29, 2016

(65) Prior Publication Data

US 2018/0032635 A1 Feb. 1, 2018

(51) Int. Cl.
*G06F 16/30* (2019.01)
*G06F 16/838* (2019.01)
*G06F 16/835* (2019.01)
*G06F 16/2455* (2019.01)
*G06F 16/958* (2019.01)

(52) U.S. Cl.
CPC ...... *G06F 16/838* (2019.01); *G06F 16/24565* (2019.01); *G06F 16/8373* (2019.01); *G06F 16/958* (2019.01)

(58) Field of Classification Search
CPC .......................... G06F 16/8373; G06F 16/838
See application file for complete search history.

(56) References Cited

U.S. PATENT DOCUMENTS

| 2004/0078361 | A1* | 4/2004 | Hu ........................ G06F 16/93 |
| 2005/0278313 | A1* | 12/2005 | Plow ..................... G06F 16/951 |
| 2005/0278321 | A1* | 12/2005 | Vailaya .................. G06F 16/951 |
| 2010/0121879 | A1* | 5/2010 | Greenberg ............ G06F 16/248 |
| | | | 707/779 |
| 2010/0329149 | A1* | 12/2010 | Singh ..................... H04L 12/28 |
| | | | 370/254 |
| 2012/0078896 | A1* | 3/2012 | Nixon .................... G06F 16/90 |
| | | | 707/732 |

OTHER PUBLICATIONS

Article entitled "Alqinni: Discarding Uncertainty through Insights and Ensuring Security", by Singh, dated Apr. 2015.*
Powerpoint presentation discussing SIFT product tittled "SIFT Demo" prepared by Mr. Joshua A Goldsberry of Alqimi Analytics and Intelligence.

* cited by examiner

*Primary Examiner* — Mahesh H Dwivedi
(74) *Attorney, Agent, or Firm* — Kenealy Vaidya LLP

(57) ABSTRACT

Some embodiments are directed to a method for exchanging data between a user terminal, and a first data source and a second data source, the method including configuring a user-defined XML configuration file stored on a portal server. The method further includes retrieving data periodically from the first data source via a periodically executed application and retrieving data aperiodically from the second data source via an aperiodically executed application. The method further includes storing a combined data retrieved from the first data source and the second data sources in a database. The method further includes displaying the combined data on the user terminal in accordance with at least one option specified in the user-defined XML configuration file.

20 Claims, 8 Drawing Sheets

SYSTEMS AND METHODS FOR RETRIEVING DATA UTILIZING A SOCIAL INTELLIGENCE FUSION TOOLKIT (SIFT)

BACKGROUND

The disclosed subject matter relates to data retrieval, and more specifically to a system and methods for retrieving data periodically and aperiodically from data sources, and displaying the retrieved data on a web portal. In particular, the disclosed subject matter relates to a portal with one or more portlets that are designed to display information from diverse data sources. Retrieved data is typically presented in web pages or web-based graphical user interfaces.

Data source can be a remote source of data or a data repository in a server. Further, the user can send a query via the web portal to retrieve data from the data source. The web portal is a single platform that brings information together from diverse data sources in a uniform way. Generally, each data source gets its dedicated area on a portal page for displaying information, which is known as a portlet. Portlets are pluggable user interface software components that are managed and displayed in a web portal. Further, portlets can be considered to be building blocks for creating complex web portals with sophisticated features.

Services relating to data retrieval can be implemented as software components that provide content and/or functionality to remote web applications through the Internet. Remote applications can submit requests for information to web services and receive content in return. Similarly, applications can pass queries to web services by deploying configuration files that contain information regarding the data source, various search filters and display options. A result is returned from the web service to the application based on the queries. Web service content can be passed to a client of the application where it can be displayed, processed, or otherwise utilized.

SUMMARY

Various applications for retrieving data from data sources and displaying the retrieved data on user or client terminals are well known. However, each application can retrieve only a specific type of data from a specific data source. Further, such applications also need to be present locally on a user or a client terminal.

Some related arts access data from multiple data sources and store the retrieved data in a data warehouse. The data stored on the data warehouse is then displayed on the client or user terminals. However, the data stored in the data warehouse may be in a raw format and further formatting of the data is required before the data can be displayed. Further, data retrieval processes are generally implemented by an application server. An application server can be any software framework that facilitates the creation of web applications and a server environment to run them. It behaves as a virtual machine to run applications. Moreover, the application server handles connections to data sources on one end and connections to the client terminal or user terminal through a web client or web portal on the other end. However, using only an application server or a cluster of application servers can limit the dynamic delivery of information. Additional processing functions need to be performed by an end-user or client to obtain information in a customized format. Further, complex client applications may be required to process the data retrieved.

Some related arts use processing devices that utilize data portlets to access data from multiple disparate data sources and store the retrieved data in a data warehouse. However, there is often an inability to develop portlet applications that can construct or spawn multiple data portlets relying on inputs from multiple disparate data sources, such as, but not limited to, the Global Database of Events, Language, and Tone (GDELT), various social media feeds or outlets, or any search tool. In some instances, there can be a mismatch between differing database configuration options. In others, it may be difficult to coordinate the simultaneous retrieval and hierarchical scoring between data sources delivering information from both periodic and aperiodic data sources.

Some related arts use applications present on user terminals to format and display retrieved data. Some other related arts use applications present on user terminals to retrieve and display data periodically. Examples of periodic data retrieval may include retrieval of weather forecasts, stock market news updates, sports news updates and the like. Yet other related arts use applications to retrieve and display data aperiodically based on one or more events. However, such applications format the retrieved data based on predetermined algorithms without providing any option to a user to control the presentation of the retrieved data. Further, such applications may not retrieve data periodically and/or aperiodically at the same instance.

It may therefore be beneficial to provide systems and methods to retrieve data from one or more data sources periodically and/or aperiodically, combine the retrieved data, and display the data in accordance with user-defined display options and data retrieval filters. Specifically, it may be beneficial to generate one or more portlets to facilitate periodic and/or aperiodic retrieval of data in a legible format. One or more portlets are generated by a portal server to facilitate a single point of access to data retrieved from data sources for end-users or clients.

It may also be beneficial to provide systems and methods to retrieve data periodically and/or aperiodically from multiple data sources and store the retrieved data in a database in a predetermined format. The stored data is displayed on a display interface of a user terminal in accordance with user-defined display options and data retrieval filters.

It may further be beneficial to provide a specification-compliant, end-user-configurable portlet that allows a user terminal to quickly access and return database data using a portal server and present it in a useful format, without programming. Using a web-interface designed for a non-technical end-user, a series of data-presentation options may be selected or configured and saved to an XML (Extensible Markup Language) configuration file. A portal server, with the portlet installed, may be used to present a view of the data as per the configuration options stored in the XML configuration file. Examples of available configuration options include data retrieval filters, data export formats (XML format, Comma Separated Values or CSV format), and various levels of summary and detail.

It may also be beneficial to provide systems and methods that enable a user to create one or more configuration files which dictate certain display options. For example, each configuration file can correspond to a specific user's desired data feeds and/or display options.

It may also be beneficial to provide systems and methods that enable a user to create one or more XML configuration files which dictate certain data retrieval filters pertaining to the data retrieval being periodic and/or aperiodic. For example, a user may provide a first query for periodic data retrieval and a second query for aperiodic data retrieval, each of the queries corresponding to a different XML configuration file. In other examples, the user may provide retrieval filters pertaining to both periodic data retrieval and aperiodic retrieval in a single query, the query corresponding to a single XML configuration file.

It may also be beneficial to use processing devices that use data portlets and related portlet applications, capable of configuring one or more data portlets relying on inputs from multiple data sources. Such data sources can include, but not restricted to, the GDELT, various social media outlets (e.g. Twitter, Facebook, etc.), the Watson server developed by International Business Machines (IBM™), various search engines or news feeds, and so forth. Also, the processing devices utilize XML configuration files to communicate with a user terminal such that a query from the user terminal may be embedded in a corresponding XML configuration file. Subsequently, based on the embedded query, data is retrieved from the multiple data sources and displayed exclusively at the user terminal.

It may also be beneficial to provide a toolkit that utilizes XML configuration files to communicate with multiple data sources, query the data sources, and provide an individualized display of retrieved data not only for a given end-user, but individualized in both display and content for a given individual query.

Some embodiments are directed to systems and methods that access data from diverse data sources, and simultaneously allow individualized displays of data for a particular user, a particular search query, or any other level of granularity.

Some embodiments are directed to systems and methods that facilitate periodic and aperiodic exchange of data between a user terminal and one or more data sources, using one or more portlets installed on a portal server.

Some embodiments are directed to a method for exchanging data between a user terminal, and a first data source and a second data source. The method includes configuring a user-defined XML configuration file stored on a portal server. The method further includes retrieving data periodically from the first data source via a periodically executed application and retrieving data aperiodically from the second data source via an aperiodically executed application. Data retrieved from the first data source and the second data source is combined and stored in a database. The method further includes displaying the combined data on the user terminal in accordance with at least one option specified in the user-defined XML configuration file.

Some other methods are directed to a method for exchanging data between a user terminal, and a first data source and a second data source. The method includes receiving a data source query through a user interface provided on the user terminal, the data source query corresponding to the first data source and the second data source. The method further includes configuring a user-defined XML configuration file stored on a portal server in accordance with the data source query. The method further includes retrieving data periodically from the first data source via a periodically executed application and retrieving data aperiodically from the second data source via an aperiodically executed application. Data retrieved from the first data source and the second data source is combined and stored in a database. The method further, includes generating one or more portlets on the user interface and displaying the combined data on the one or more portlets in accordance with at least one option specified in the user-defined XML configuration file.

Yet other embodiments are directed to a system for exchanging data between a user, and a first data source and a second data source, the system includes a user interface that is configured to receive a data source query file at the user terminal, the data source query file corresponding to the first data source and the second data source. The system further includes a processor that is configured to generate a user-defined XML configuration file based on the data source query, the user-defined XML configuration file comprising a first set of options for periodic data retrieval and a second set of options for aperiodic data retrieval. The system further includes a portal server communicably coupled to the user interface. The portal server is configured to access the user-defined XML configuration file. The portal server is further configured to retrieve data from the first data source via a periodically executed application in accordance with the first set of options, and retrieve data from the second data source via an aperiodically executed application in accordance with the second set of options. Data retrieved from the first data source and the second data source is combined and stored in a database. The portal server is further configured to display the combined data on the user interface in accordance with at least one option specified in the user-defined XML configuration file.

BRIEF DESCRIPTION OF DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill. in the art will recognize a number of equivalent variations of the various features provided in the description that follows.

I. Server Environment

Figure 1A:
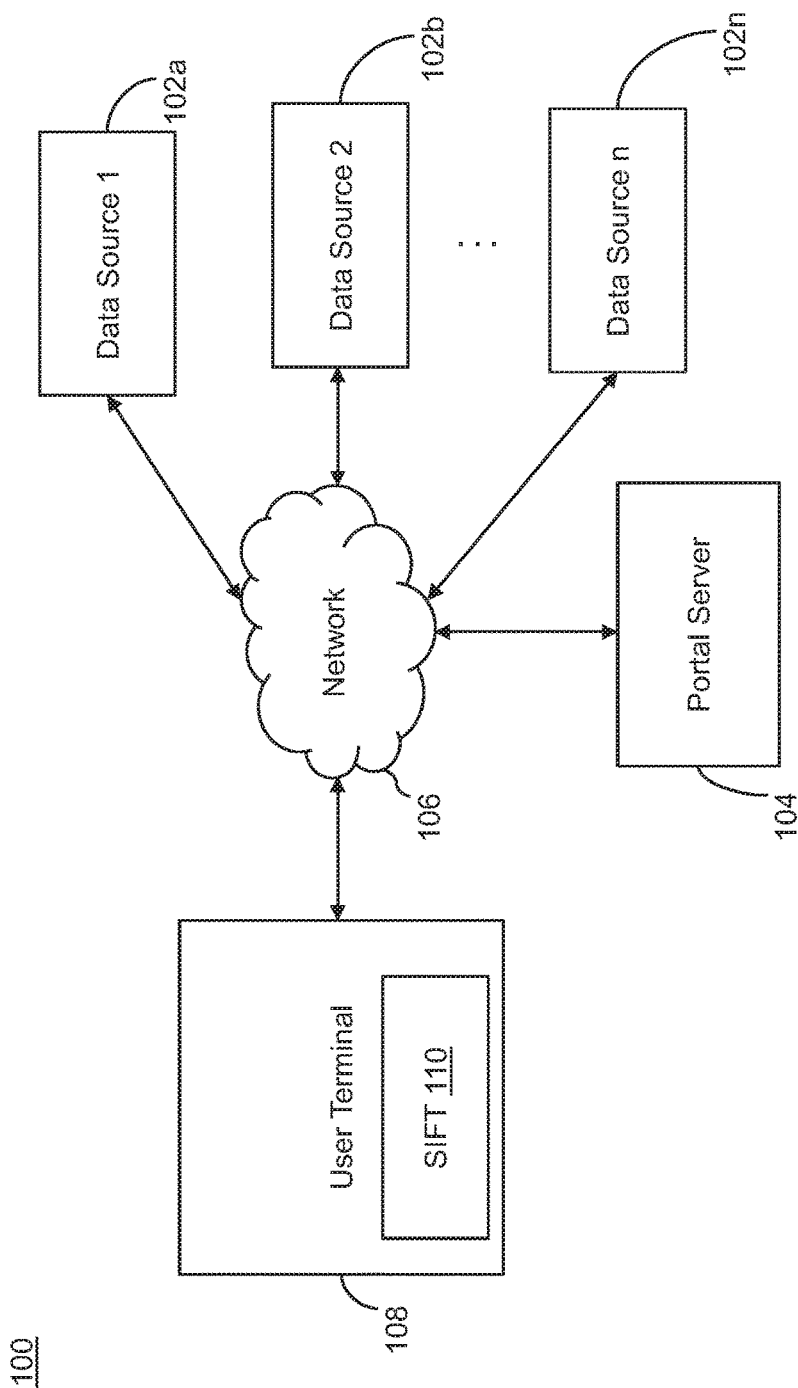
FIGS. 1A, 1B and 1C illustrate various exemplary systems for retrieving and displaying data in accordance with the disclosed subject matter.

FIG. 1A is an illustration of a system 100 in accordance with the disclosed subject matter. The system 100 is configured to retrieve and display data. Specifically, the system 100 facilitates exchange of data between a user terminal 108 and one or more data sources 102a to 102n (hereinafter referred to as "the data sources 102") through one or more portlets installed on a portal server 104. The user terminal 108 can be any device having a display (not shown) for displaying data and a user interface (not shown) for receiving inputs from an end-user. The device can be a desktop, a laptop, a phone, a tab, and so forth. The display can be an CRT display, an LED display, a touchscreen etc. The user interface can be a keyboard, a touchscreen, a voice recognition module, and so forth.

The data sources 102 may correspond to social media feeds or social networks which comprise of posts or articles associated with various types of data added or modified frequently by subscribers to the social media feed or social network. Alternately, the data sources 102 may correspond to media databases or data repositories that include different types of data, the media database or data repository being managed by a database administrator or the like. Examples of a media database include the Global Database of Events, Language and Tone (GDELT).

In some instances, the portal server 104 may be positioned in series with the user terminal, or may even be configured as a part of the user terminal itself (such as an app, Operating System routine, or the like). The data to be exchanged is retrieved in accordance with an Extensible Markup Language (XML) configuration file that may contain various forms of information. This information can include, but is not limited to, connection information, display options, and other configuration information. The XML configuration file can also include data retrieval filters, keywords, metadata or metadata tracking information, and so forth.

In some embodiments, the user terminal 108 can provide a data source query to retrieve periodic data from the data sources 102. Periodic data retrieval pertains to data being retrieved at finite intervals of time. For example, a query provided by an end-user regarding the topic "French food" may include a data retrieval filter specifying posts or articles from a social network or social media feed to be retrieved every three hours. Another example of the query may include a data retrieval filter specifying data pertaining to "French food" to be retrieved, every four hours, from a media database such as the GDELT. Accordingly, information regarding "French food" is retrieved and displayed to the end-user at the end of a specified finite interval.

In some other embodiments, the user terminal 108 can provide a query to retrieve data from a data source aperiodically. Aperiodic data retrieval includes data from the data sources 102 being retrieved and displayed to an end-user in response to a data source query not specifying periodic data retrieval. Additionally, aperiodic data retrieval includes retrieving data from the data sources 102 in response to an event trigger specified in a data source query. Event triggers can include a new post or article being added or data being updated in the data sources 102. In particular, the event trigger corresponds to data that is described by a set of keywords, timestamp, a geographic location, and so forth, all of which are specified in the data source query.

For example, a data source query may comprise a query to retrieve data from a social network, relating to "French Food". Further, an event trigger may be specified in the data source query such that articles or posts regarding "French Food" posted on the social network from the town of Bordeaux in France are retrieved. Posts relating to "French Food" from Bordeaux may be created at any given time and the system 100 is configured such that any such post or article appearing on the social network is immediately identified and retrieved in accordance with the data source query. Further examples of an event trigger can be posts or articles regarding "French Food" appearing on the social network or social media feed at a specific time, such as 2 PM. Upon identification of the aforementioned events, data is retrieved accordingly. Event triggers are not limited to the aforementioned examples but can also include addition or modification of data records in the data sources 102 pertaining to the topic or keywords specified in the data source query. The data can be retrieved at any time so long as an event trigger is identified.

In other embodiments, the data sources 102 can be any type of data source including social media networks, search engines, portals, remote servers, network storage units etc. Embodiments are also intended to include or otherwise cover any other type of data source. The data sources 102 are merely provided for exemplary purposes, and the various inventive aspects are intended to be applied to any type of data source on a network 106 connected to the portal server 104 and the user terminal 108. The portal server 104 is therefore communicably coupled to the user terminal 108 through the network 106.

The network 106 may include a data network such as, but not restricted to, the Internet, local area network (LAN), wide area network (WAN), metropolitan area network (MAN) etc. In certain embodiments, the communication network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments, the communication network 106 may include or otherwise cover networks or subnetworks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or asynchronous transfer mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the network 106 may further include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments are intended to include or otherwise cover any type of network, including known, related art, and/or later developed technologies to connect the data sources 102, the portal server 104 and the user terminal 108 with each other.

The user terminal 108 is intended to include any electronic device, such as desktop computers, portable computers, smart phones, tablet computers, wearable devices, and the like. The user terminal 108 may also include a display unit (not shown) for displaying any data. The display unit can include, but not limited to, a Cathode Ray Tube (CRT) display, a Liquid Crystal Display (LCD), a Light Emitting Diode (LED) display, and the like. Embodiments are intended to include or otherwise cover any type of display, including known, related art, and/or later developed technologies.

Figure 1B:
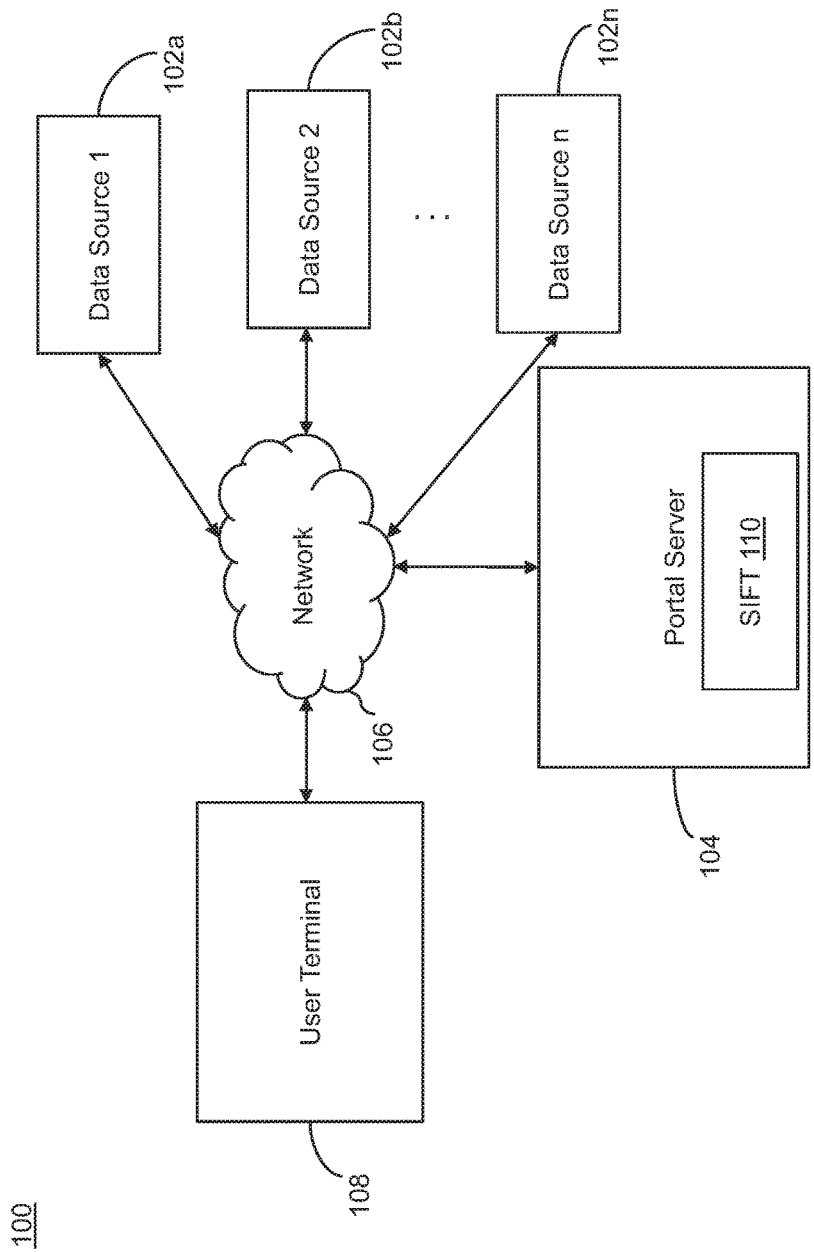
Figure 1C:
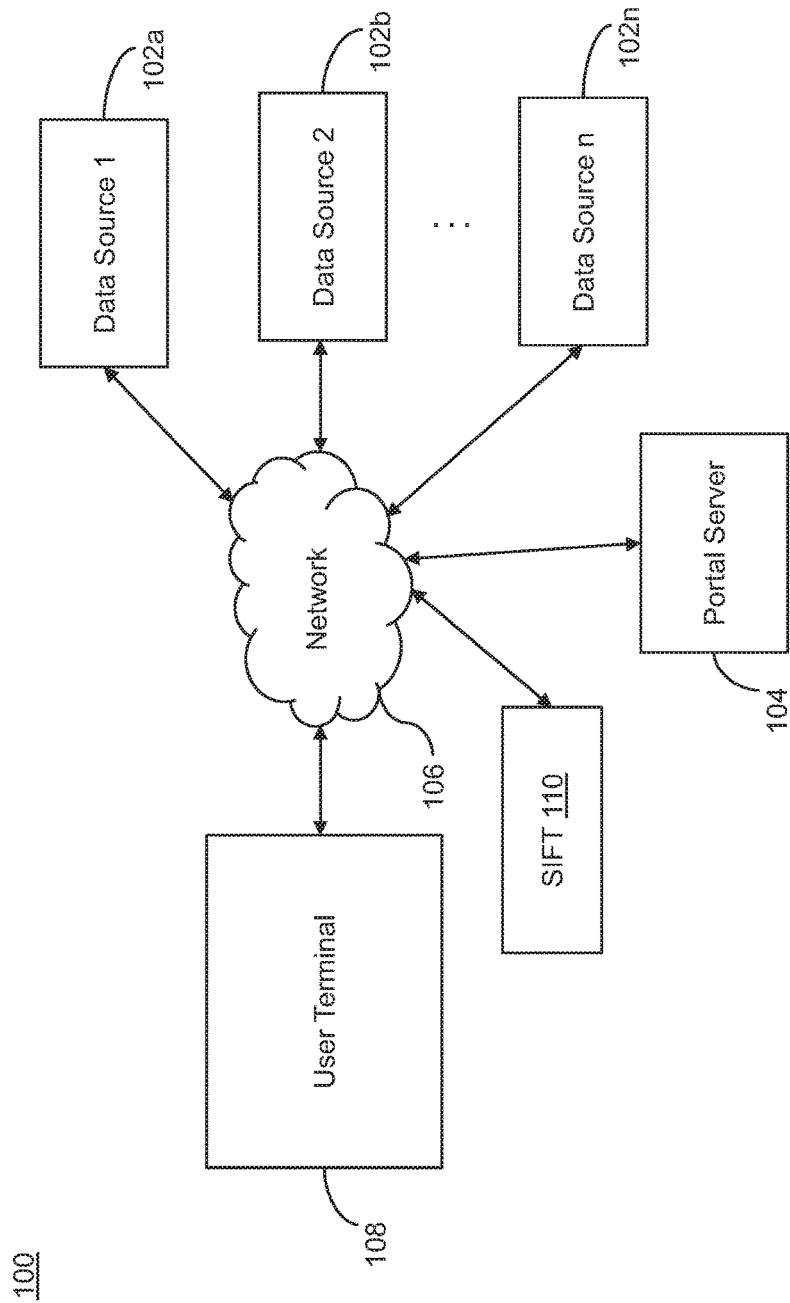

The portal server 104 includes a Social Intelligence Fusion Toolkit 110 (hereinafter referred to as "the SIFT 110") that is a specification-compliant, end-user-configurable portlet that allows a user terminal 108 to quickly access and return database data using a portal server and present it in a useful format, without requiring any programming expertise from the end-user. In some embodiments, the SIFT 110 may be part of the user terminal 108, as seen in FIG. 1A. In some other embodiments, the SIFT 110 may be part of the portal server 104 (as shown in FIG. 1B). In yet other embodiments, the SIFT 110 may be placed next to the user terminal 108 (as shown in FIG. 1C).

Through a web-interface or user interface designed for a non-technical end-user, a series of data-presentation options may be selected (configured) and saved into an XML (Extensible Markup Language) configuration file. The XML configuration file can also be manually configured. For example, the XML configuration file may be configured in a word processing application. The portal server 104, with the SIFT 110 installed, is used to present a view of the data as per the configuration options stored in the XML configuration file. Examples of available configuration options include data retrieval filters, data export formats (XML format, csv format), and various levels of summary and detail. The XML configuration file may further include artistic guidelines, such as displaying a three-day weather forecast in the top-left corner of a portal page, and news in the bottom-right corner of the portal page. The XML configuration file may also be arbitrarily specific, such as weather in Seattle being displayed in the top left of the portal page, while arrest reports from anyone in Miami named "Edward" being displayed in the bottom right corner of the portal page.

In some embodiments, a processor (not shown) associated with the user terminal 108 may generate the XML configuration file and store it on a memory (not shown) associated with the user terminal 108. Further, the portal server 104 may be communicably coupled to the user terminal 108 in order to access the configuration options stored in the XML configuration file. In other embodiments, the processor that generates the XML configuration file may be associated with the portal server 104.

The portal can be a web portal or an enterprise portal and is configured to aggregate data from different sources and display the aggregated data. In an embodiment, the portal is a web page that brings information together from diverse sources. Each piece of information from a specific source may be provided with a dedicated display or presentation area on the portal as defined by an end-user or web designer. The dedicated display or presentation area is handled or managed by one or more portlets. Portlets are applications used by a data portal website to receive requests from a client terminal or a user terminal, and return information. In some embodiments, the portal server 104 is the middleware between an application server (not shown) and the user terminal 108. The portal server 104 can run on top of the application server or a cluster of application servers. The application server or the cluster of application servers can host web applications related to data retrieval.

II. Portals and the Social Intelligence Fusion Toolkit

A web portal is a specially designed web site that brings information together from diverse sources in a uniform way. Usually, each information source gets its dedicated area on the page for displaying information (a portlet). Optionally, the end-user can configure which of the portlets to display. Variants of portals include mashups and intranet "dashboards" for executives and managers. The extent to which content is displayed may depend on the intended end-user and the intended purpose, as well as the diversity of the content. Very often design emphasis is on a certain "metaphor" for configuring and customizing the presentation of the content, and the chosen implementation framework and/or code libraries. In addition, the role of the end-user in an organization may determine which content can be added to the portal or deleted from the portal configuration.

A portal may use a search engine application program interface (API) to permit end-users to search intranet content as opposed to extranet content by restricting which domains may be searched. Apart from this common search engines feature, web portals may offer other services such as e-mail, news, stock quotes, information from databases and even entertainment content. Portals provide a way for enterprises and organizations to provide a consistent look and feel with access control and procedures for multiple applications and databases, which otherwise would have been different web entities at various uniform resource locators (URL). The features available may be restricted by whether access is by an authorized and authenticated end-user (employee member) or an anonymous site visitor.

Portal servers provide a central platform for accessing web content and resources (data, docs, apps, integrations, alerts, etc.). A core feature of a portal is to provide a central URL that permits an end-user to have a custom web experience based upon the end-users' login identity. This functionality is termed role-based content delivery, or RBCD, and is a main focus for portals.

Given that portal pages can include both applications (portlets and widgets) and web content, many related arts disclose portals supporting integration to an external web content management system (WCMS) allowing content to be created or managed in a WCMS that appears in a portal page. This two-step process of adding content prompted some other portals to create an embedded WCMS.

Some portals allow end-users to interact with the system. End-users are often allowed to create their own pages or sites, to add collaboration apps to those pages and to define end-user access to those pages. Many portals also enable power end-users to have added features, such as web forms, workflows, dynamic lists and polls.

Referring to FIGS. 1A, 1B and 1C, the system 100 includes a Social Intelligence Fusion Toolkit (SIFT) 110. The SIFT 110 may have one or more portals to provide data to the end user. The SIFT 110 is an easy-to-use, powerful, and flexible system capable of searching and collecting open source and/or social media data. The SIFT 110 may provide tools and applications for carrying out various operations including, but not restricted to, data analytics, reporting, collaboration, dissemination, and so forth. The SIFT 110 may collate data from the data sources 102 in unique, expansive, progressive, and interactive visualizations. In response to a query from the user terminal 108, the SIFT 110 facilitates retrieval of data from the data sources 102 and can combine the retrieved data with associated sets of data stored on the portal server 104 and/or the user terminal 108 for further analysis. The combined data can be analyzed by other portlets or external software modules as per the requirements of the end-user and displayed accordingly at the user terminal 108. The SIFT 110 may utilize filters that are generated in response to query from the user terminal 108 to retrieve the data. Further, the SIFT 110 can utilize additional filters to prevent redundancy in the combined sets of data before displaying the combined data at the user terminal 110. In some embodiments, the SIFT 110 can include a geolocation element for specific geographical area searches. In some embodiments, the SIFT 110 can also import and export data using Extensible Markup Language (XML), JavaScript Object Notation (JSON), Keyhole Markup Language (KML), or Comma Separated Values (CSV) output.

Figure 2:
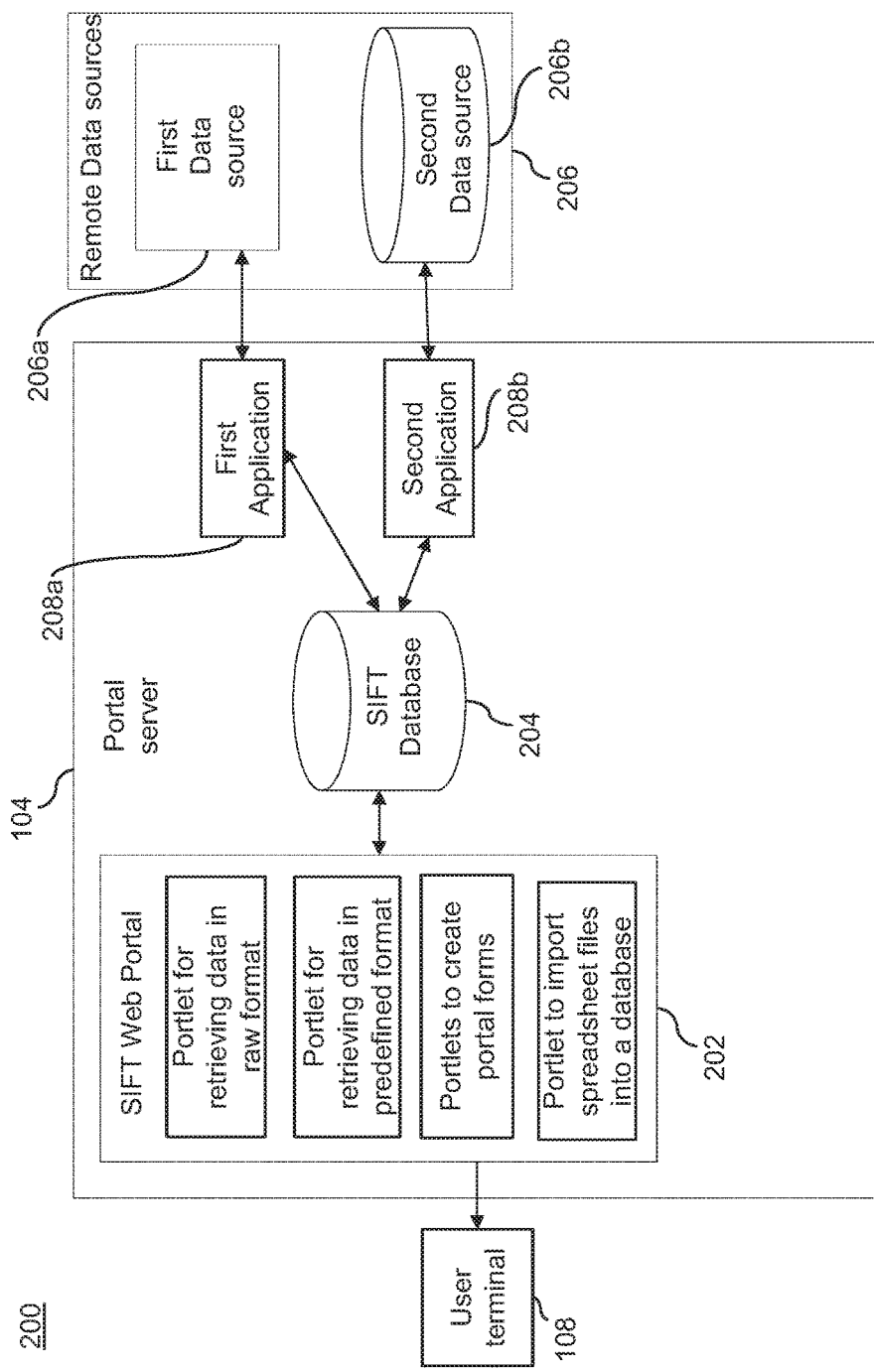
FIG. 2 illustrates an exemplary embodiment of a Social Intelligence Fusion Toolkit (SIFT) architecture in accordance with the disclosed subject matter.

FIG. 2 illustrates an exemplary system 200 including a SIFT web portal 202, a SIFT database 204, the user terminal 108, a first data source 206a and a second data source 206b. The SIFT web portal 202 and the SIFT database 204 may be part of a SIFT architecture installed and placed on the portal server 104. Further, the first and second data sources 206a, 206b can be collectively referred to as the data sources 206. An end-user can create one or more XML configuration files through the user terminal 108. The XML configuration files may specify certain display options. For example, each XML configuration file can correspond to a specific user's desired data feeds and/or display options (e.g., configuration file 1 for John, configuration file 2 for Heather, and so forth).

In another example, one or more XML configuration files may be configured such that a query for "John Smith" returns a certain set of results, through a first set of configured or previously configured portlets, from a first list of data sources, among the data sources 206, in accordance with a first set of display options. A second query for "Jane Smith" returns a second set of results, through a second set of configured or previously configured portlets, from a second list of data sources, among the data sources 206, in accordance with a second set of display options. In this configuration, each query can be unique in the context of both the sets of display options and the search terms or data sources utilized under the query.

Alternatively, XML configuration files can correspond to different topics of interest, such as weather forecasts around a country (configuration file 1), political news (configuration file 2), etc. Additionally, XML configuration files can address connection differences and query formats between different data source configuration options. Configuration options or data retrieval filters specified in the XML configuration file can also prioritize data from different data sources based on the data source, time of receipt of information, volume of information (e.g., an extremely popular social media topic), geographic significance, or cross-related topics such as, but not restricted to, election results, riots, economic reports, etc. Further data retrieval filters may also be applied for specifying factors such as, but not restricted to, the time duration of messages on a particular topic (new or ongoing), age range of interest in a given topic, tone (positive or negative), categorization of a particular topic (or query) etc. In some embodiments, the SIFT 110 can prioritize one or more data sources for the retrieval of data. For example, retrieval of data from the first data source 206a can be prioritized over the retrieval of data from the second data source 206b by the SIFT 110, as per the data retrieval filters in the XML configuration file. The configuration files can also set the display options that can ultimately appear on a portal page displayed on the SIFT web portal 202.

The portal server 104 further includes a first application 208a and a second application 208b that are configured to retrieve data periodically and aperiodically, respectively, from the data sources 206. In an embodiment, the first application 208a may retrieve data periodically from the first data source 206a and the second application 208b may retrieve data aperiodically from the second data source 206b. Further, in various embodiments, the first application 208a and the second application 208b can also be installed on the application server (not shown), the portal server 104 or on the user terminal 108.

In some embodiments, the first application 208a can be, but not restricted to a periodic Global Database of Events, Language and Tone (GDELT) connector. Further, the second application can be, but not restricted to, an aperiodic Apache Storm application to extract data aperiodically. In fact, embodiments of the present subject matter are intended to include or otherwise cover any type of application to retrieve data periodically and/or aperiodically from a data source.

An end-user can create data source queries on the user terminal 108 based on the data to be retrieved. Each data source query can create one or more user-defined Extensible Markup Language (XML) configuration files (hereinafter referred to as "XML configuration files"). The data source queries include, but are not limited to, data retrieval filters, display options, a first set of options for periodic data retrieval, and/or a second set of options for aperiodic data retrieval. The first set of options can include, but not limited to, a checkbox for selecting periodic data retrieval, option for selecting time period for periodic retrieval of data, and the like. The second set of options can include, but not restricted to, a checkbox for selecting aperiodic data retrieval, option for selecting an event trigger for aperiodic retrieval of data, and the like. The data source query can also include one or more identities indicative of one or more data sources and one or more sets of keywords. Specifically, the data source query can correspond to the first data source 206a and the second data source 206b, and can include one or more identities indicative of the corresponding data source(s). In some embodiments, the data source query can correspond to any one or a combination of multiple data sources that may or may not include the data sources 206.

The XML configuration files, that are based on the data source queries, can therefore include the data retrieval filters, the display options, the first set of options for periodic data retrieval and the second set of options for aperiodic data retrieval. The configuration files can also include connection information corresponding to the first data source 206a and/or the second data source 206b. Connection information includes, but is not limited to, IP addresses, subnet masks, domain name server addresses, host name and suffix, execution parameters, system information pertaining to the user terminal 108 and/or the portal server 104. The display options include, but are not limited to, at least one of a tabular layout, a chart layout, a news layout, a form layout, and a bullet layout. The data retrieval filters include one or more identities indicative of a data source as the first data source 206a, and/or the second data source 206b.

The portal server 104 includes a non-transitory computer readable medium that can be configured to access data from the first data source 206a and/or the second data source 206b. In other embodiments, the portal server 104 includes a non-transitory computer readable medium that is configured to access data from remote data sources not limited to the first data source 206a and the second data source 206b. The non-transitory computer readable medium may be a set of instructions executable by the portal server 104 to carry out various operations including, but not limited to, accessing and retrieving data, storing data, generating portlets and displaying data through the portlets. In some embodiments, the non-transitory computer readable medium can be configured by the portal server 104 to carry out various operations. Moreover, configuring the non-transitory computer readable medium may include executing the instructions stored therein.

The first and/or second data sources 206a, 206b may correspond to social media feeds or social networks which include posts or articles associated with various types of data added or modified frequently by subscribers to the social media feed or social network. Alternately, the first and/or second data sources 206a, 206b may correspond to media databases or data repositories that include different types of data, the media database or data repository being managed by a database administrator or the like. Examples of a media database include the Global Database of Events, language and Tone (GDELT). In some embodiments, the first and second data sources 206a, 206b can be both social media feeds or media databases. In some other embodiments, one of the first and second data sources 206a, 206b can be a social media feed while the other can be a media database. In yet other embodiment, the first data source 206a can be a social media feed, while the second data source 206b can be a media database.

In some embodiments, the SIFT web portal 202 can be installed on the portal server 104. One or more XML configuration files provide connection information, user-defined display options and data retrieval filters to the portal server 104 using the SIFT web portal 202. In some embodiments, the SIFT web portal 202 can include one or more portlets to display retrieved data. Further, these portlets may have different functionalities such as, but not restricted to, facilitating the creation and storage of configuration files containing document data, markup, and script code for manipulating data, display of retrieved data and the like. Some of the portlets may serve as an intermediary between a portal web-page and a database, thus allowing a user terminal 108 to send a data source query to the portal server 104 and return data in a raw format. Some other portlets may allow the user terminal 108 to access and return database data via a portal server and present it in a pre-defined format, without programming. Yet other portlets may allow the user terminal 108 to create portal forms by selecting various types of form fields, thus building a form through a series of selections saved to an XML configuration file while various other portlets may allow the user terminal 108 to enable import of data from spreadsheet files into a database.

In some embodiments, the connection information, the user-defined display options and the data retrieval filters form a user-defined data source query having a corresponding XML configuration file.

Each XML configuration file can be stored on the portal server 104. In some embodiments, each XML configuration may be stored in a database (not shown) on the portal server 104. The portal server 104 can utilize a single query defined by the user terminal 108 to extract data from multiple tables within the SIFT database 204. In some embodiments, the SIFT database 204 may be a relational database and/or an object-relational database. The SIFT database 204 organizes data into one or more tables of columns and rows with a key identifying a row and/or column in each table. The keys for each row and/or column are used to define logical connections (called relationships) among the tables. Based on the user-defined data source queries, the data residing in the tables are retrieved such that the data can be presented at the user terminal 108 in a legible format. The data stored in multiple tables on the SIFT database 204 is retrieved from any one or a combination of the first data source 206a and the second data source 206b.

In some embodiments, the portal server 104 may retrieve data from the first data source 206a and/or the second data source 206b, and store in the SIFT database 204 in real time as per the data source query received at the portal server 104. In some other embodiments, the portal server 104 may store data in the SIFT database 204 prior to receipt of the user query at the portal server 104.

In some embodiments, the first application 208a may extract the first set of options from the XML configuration file, and retrieve a set of data periodically based on the time period embedded in the XML configuration file. The second application 208b may extract the second set of options from the XML configuration file, and retrieve a set of data aperiodically based on the event trigger embedded in the XML configuration file.

Further, data extracted by the portal server 104 is stored in the SIFT database 204 in a predefined format. The predefined format corresponds to the data being organized in multiple tables with a key identifying a row and/or column in each table in the data. Logical connections are provided between the rows and columns of one table and the rows and columns of another table.

In some embodiments, the portal server 104 can transform the data retrieved from the first data source 206a and/or the second data source 206b in accordance with the predefined format and populate the tables of the SIFT database 204 with the transformed data. The portal server 104 can implement various algorithms to convert or transform the retrieved data including, but not limited to, including statistical methods, probabilistic methods, and so forth. In case, no data corresponding to the data source query is retrieved, then the corresponding tables in the SIFT database 204 are left blank. Therefore, the SIFT database 204 may allow standardization of data from different data sources, and enable quick display of the stored data in accordance with the predefined format, and the first and/or second set of options. The set of data retrieved periodically and the set of data retrieved aperiodically may be combined such that both sets of data may be stored in a table at the SIFT database 204. In some other embodiments, the set of data retrieved periodically and the set of data retrieved aperiodically may be combined at the SIFT database 204 such that both the sets of data may be displayed together. The data can be retrieved periodically and aperiodically based on the common set of data retrieval filters specified in the XML configuration file in addition to the first and second set of options. For example, a set of keywords may be common for both periodic data retrieval and aperiodic data retrieval. Displaying both the sets of data together adds further emphasis to the retrieved data and provides a correlation between the two sets of data. For example, an end-user can compare periodically retrieved data with aperiodically retrieved data for a common set of data retrieval filters including a common set of keywords. Further, the combined data can be displayed at the SIFT web portal 202 in accordance with the first set of options and/or second set of options specified in the user-defined XML configuration file. Further, the combined data can also be displayed in accordance with one or more common display options that can include a layout, location and font of displayed data. The common display options can also be specified in the XML configuration file.

The data retrieved periodically and the data retrieved aperiodically can be combined based on various parameters, such as location, timestamp, source, and so forth. For example, if the data retrieved periodically and the data retrieved aperiodically share a common source (such as, a common author), then such data can be combined together.

In another example, data having same timestamps or having timestamps that fall within a particular range may be combined together. In yet another example, data sharing same locations may be combined together. Furthermore, the end-user may enter certain options in the data source query that control combination of data based on various parameters.

For example, the user terminal 108 may request information concerning the weather of London to be retrieved every ten minutes from the first data source 206a. The first data source 206b may be specified to be a social media feed in the user-defined data source query. The user terminal 108 may also request data triggered by the aperiodic reporting of any sudden climatic changes related to the El Nino phenomenon observed around the globe. This data is requested from the second data source 206b, which is specified to be a media database. Both requests, namely the request for periodic weather information pertaining to London and the request for climatic changes related to the El Nino phenomenon may be specified in the same data source query. Accordingly, the data retrieved may be combined in the SIFT database 204 such that both sets of data may be displayed together via one or more portlets at the user terminal 108. The reports on the sudden climatic changes pertaining to the El Nino phenomenon may be accompanied by social media posts regarding the weather of London updated every ten minutes.

In some embodiments, the first application 208a and the second application 208b may retrieve the data from the first and second data source 206a, 206b, respectively, and store the retrieved data in a combined form in the SIFT database 204.

The portal server 104 includes a set of software applications that enables generation of portals. The portal server 104 further acts as a single access point for the user terminal 108 to retrieve data from the first data source 206a and/or the second data source 206b.

In an embodiment, the data source queries including the display options, the first set of options, the second set of options and the data retrieval filters may be obtained via a user interface which will be described in detail hereinafter.

Figure 3:
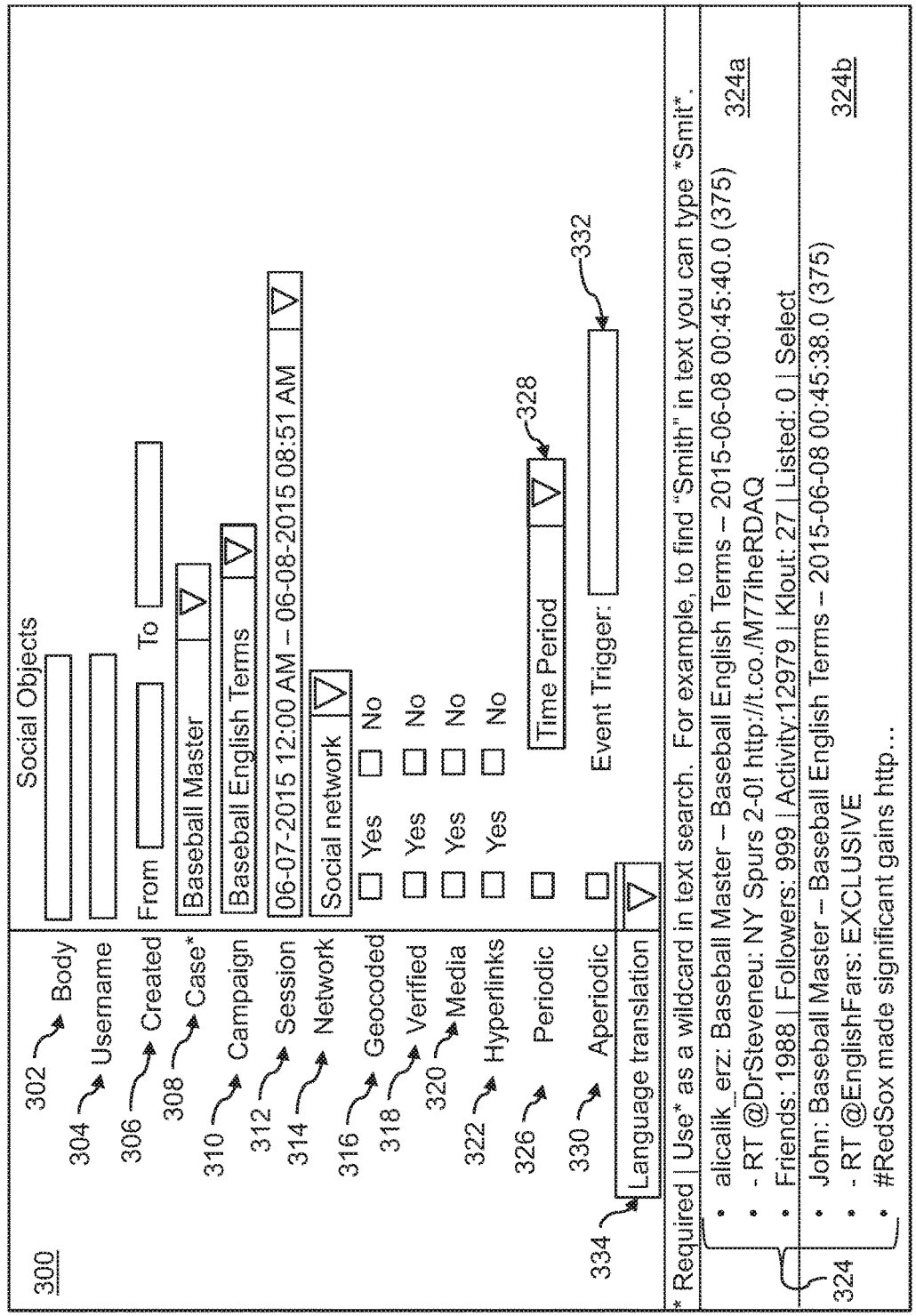
FIG. 3 is a schematic of a user interface shown on a portal page in accordance with the disclosed subject matter.

FIG. 3 illustrates an exemplary embodiment of a user interface 300 presented on the user terminal 108. The user interface 300 can be a web based interface that can communicate with the portal server 104. The user interface 300 includes fields for various query parameters. The fields include, but are not limited to, a body field 302, a username field 304, a query creation dates field 306, a query title or case field 308, a language of retrieved data field 310, date/time stamp details field 312, a data source field 314, a location filters field 316, an authenticate filters field 318, a selection field 320 for the retrieval of images, a hyperlinks filters field 322 for audio/video options, a periodic data retrieval field 326, a time period field 328 for periodic data retrieval, an aperiodic data retrieval field 330, an aperiodic data event trigger field 332, and a language translation field 334.

The periodic data retrieval field 326 may include a checkbox to enable the end-user to select periodic data retrieval of data. If the end-user selects the periodic data retrieval field 326, a first parameter or a flag indicative of periodic data retrieval may be included in the user-defined data source query and the corresponding XML configuration file. Similarly, the aperiodic data retrieval field 330 may include a checkbox to enable the end-user to select aperiodic data retrieval of data. If the end-user selects the aperiodic data retrieval field 330, a second parameter or a flag indicative of aperiodic data retrieval may be included in the user data source query and the corresponding XML configuration file.

The portal server 104 may determine that the data source query includes the first parameter indicative of periodic data retrieval and selects a default time period. Further, the time period field 328 may include a drop down menu for multiple time periods that can be chosen by the end-user. If the end-user does not select a time period, the portal server 104 may use the default time period for periodic data retrieval. The portal server 104 may accordingly generate the first set of options that includes the first parameter and the user-defined time period or the default time period. The time period may be in various magnitudes, including seconds, minutes, hours, days, and so forth. In some embodiments, the portal server 104 may generate the first set of options including the default time period upon determining that the data source query includes the first parameter. In case, the end-user selects a time period, the portal server 104 may modify the first set of options to include the user-defined time period.

The portal server 104 may further determine that the data source query includes the second parameter indicative of aperiodic data retrieval. Further, the aperiodic data event trigger field 332 may enable the end-user to enter an event trigger required for aperiodic data retrieval. If the end-user fails to provide an event trigger, the portal server 104 may set the event trigger as a new event or entry at the corresponding data source. The portal server 104 may accordingly generate the second set of options that includes the second parameter and the event trigger.

Results are displayed according to choices made in the aforementioned fields at a results field 324. In some embodiments, the results field 324 is associated with one or more portlets. Each of the fields 302 to 322, fields 326 to 332 and the results field 324 correspond to one or more portlets generated by the portal server 104. Further, the results are displayed through a first portlet 324a and a second portlet 324b. The first portlet 324a and the second portlet 324b may be generated by the portal server 104. In some embodiments, the first portlet 324a may include data retrieved periodically, while the second portlet 324b may include data retrieved aperiodically or a combination thereof. In other embodiments, the first portlet 324a and the second portlet 324b can display data combined from the data retrieved periodically by the first application 208a and the data retrieved aperiodically by the second application 208b.

In some embodiments, the first application 208a may extract the first set of options from the XML configuration file, and retrieve data periodically based on the time period embedded in the XML configuration file. The first application 208a may further generate the first portlet 324a to display the periodically retrieved data. The first application 208a may also periodically refresh the first portlet 324a

In other embodiments, the second application 208b may extract the second set of options from the XML configuration file, and retrieve data aperiodically based on the event trigger embedded in the XML configuration file. The second application 208b may further generate the second portlet 324b to display the aperiodically retrieved data.

In some embodiments, the first application 208a and the second application 208b may retrieve the data from the first and second data sources 206a, 206b, respectively, and store the retrieved data in a combined form at the SIFT database 204. Further, the combined data can be displayed at the SIFT web portal 202 in accordance with the first set of options and/or second set of options specified in the user-defined XML configuration file.

In some embodiments, the user interface 300 includes a language translation field 334. Further, the language translation field 334 may include a drop down menu providing multiple choices for languages into which the data retrieved in accordance with choices made at the fields 302 to 322 and fields 326 to 332 can be translated. The drop down menu contains multiple languages, such as, but not restricted to, German, Mandarin, Farsi, French, Urdu, Spanish, Hindi, Punjabi, Telugu and so forth, in which the retrieved data can be translated. In case a language from the drop-down menu is not selected by an end-user, the portal server 104 may use a default language for data retrieval. In case, the end-user selects a particular language, the portal server 104 translates the retrieved data in the user-defined language and display the translated data in the results field 324. The portal server 104 may include a language translation application that facilitates any language translation requirement in accordance with the choice specified at the language translation field 334. The language translation application serves as a platform for translating data to be retrieved from one language to another.

In some embodiments, the portal server 104 may suggest options for language translation of the retrieved data on the basis of the location of the end-user or the user terminal 108. For example, if the end user is in Germany, then the portal server 104 may suggest the end user to translate the language of the retrieved data into German. The portal server can prompt the end user to translate the language of the retrieved data via an alert box, a pop-up window, etc. The retrieved data is displayed at the portlets 324a and 324b in German or the default language based on an input of the end-user following the prompt. The language translation application serves as an intermediary between a web interface such as, but not restricted to, the SIFT web portal 202, and data sources 206, thus allowing the user terminal 108 to transmit a data source query in order to retrieve data from data sources 206.

A data source query is compiled from the choices made on the user interface 300. The portal server 104 in conjunction with first application 208a and second application 208b periodically and/or aperiodically retrieves and displays data at the results field 324. Data is retrieved from the first and second data sources 206a, 206b and stored on the SIFT database 204.

Choices made on the user interface 300 form the user data source query and is embedded into the Extensible Markup language (XML) configuration file stored on the user terminal 108. An example of the information stored in the XML configuration file is shown below:

```
<QuerySettings>
    <DatabaseVendor>PostgreSQL</DatabaseVendor>
    <Connection>
        <ConnectionID>2</ConnectionID>
    </Connection>
    <QueryString>SELECT verifiedimg, verifiedyn, username, displayname,
authorkloutscore, useractivitycount, friends,
followers, listedcount, favoritescount, retweetcount,
generator, verified, profileimgurl, network, created, createdyear,
createdmonth, createdday, body, isre, origobjsrcid, objectsrcunid,
origauthor, sourceid, hashtags,
languages, expandedurls, verb, usermentionsnames, usermentionsids,
mediaurls, Ion, lat, headline,
tagline, createdby, objectcreateddate, geocoordinates,
linktoobject, resultid, Geocoded, globe, resultid, id, userbiolocation,
```

-continued

```
mediatype, usermentionsscreennames, actorid, verified, userbiolocation,
sentiment_tag, sentiment_score, user_sentiment_votes,
user_sentiment_average, user_sentiment_mode, user_sentiment_median,
mediayn, tsv_body
```

The above is a snippet from an exemplary XML configuration file used in accordance with the disclosed subject matter. Each XML configuration file uses a single query extracted from the input through the user interface 300 to retrieve data from multiple tables within the SIFT database 204.

The XML configuration file is used for the processing, definition and presentation of data on the user interface 300. Through the XML configuration file, code is specified for formatting various layouts and styles pertaining to presentation of data. The XML configuration file, as seen in the sample code above, includes the user-defined data source query, that further includes communication information, the display options, the data retrieval filters, the first set of options and the second set of options. The XML configuration file also provides connection information to enable a connection between the user terminal 108 and the SIFT database 204. The multiple fields 302 to 322, and 326 to 332 may be populated by an end-user. Based on the information provided through the fields 302 to 322, and 326 to 332, various display options and data retrieval filters, such as the tags provided in the XML code above, are enabled and form a user-defined data source query. Subsequently, based on the user-defined query, the portal server 104 extracts the data corresponding to the retrieval filters specified at the fields 316 to 322, and 326 to 332 from the data sources specified at the data source field 314. The data is extracted and stored in a predefined format at the SIFT database 204. Subsequently, the extracted data is presented based on the display options specified in the user-defined query through the first portlet 324a and second portlet 324b.

In order for a single query, such as that shown in the XML sample above, to retrieve data from multiple sources, the data would need to exist in any of the first data source 206a and/or the second data source 206b specified in the query and in the SIFT database 204.

The database connection details or connection information, such as that referenced in the XML code above, can be specified in the same XML configuration file or a separate XML configuration file.

The SIFT 110 in cooperation with the user interface 300 can therefore allow individualized display of retrieved data for both a particular user and/or a particular query based on the inputs to the fields 316 to 322, and 326 to 332. Specifically, the SIFT 110 can implement a specific display configuration for a particular user and/or a particular query.

III. Exemplary Embodiments

In an exemplary embodiment according to the disclosed subject matter, a first XML configuration file is generated at the user terminal 108 with a first data source query embedded therein. The data source query includes connection information, data retrieval filters, a first set of options for periodic data retrieval, a second set of options for aperiodic data retrieval and display options. As shown in FIG. 3, the fields 302 to 322 and the fields 326 to 332 in the user interface 300 are populated such that user-defined options relating to data retrieval filters and display options are specified. The user interface 300 is displayed on a display interface (not shown) that is included with the user terminal 108. In accordance with the sample XML code above, the populated fields 302 to 322 and 326 to 332 enable selections of the query strings such that the user query is created and embedded into the XML configuration file. Embedding the user query in the XML configuration file can be performed by the portal server 104. Thus, the portal server 104 configures the XML configuration file in accordance with the user query received at the user terminal 108.

In some embodiments, the end-user may enable periodic data retrieval by checking the periodic data retrieval field 326 and defining a time period at the time period field 328, thereby providing the first set of options in the data source query. Further, in some other embodiments, the end-user may enable aperiodic data retrieval by checking the aperiodic data retrieval field 330.

The SIFT database 204, as shown in FIG. 2, stores data retrieved from the first data source 206a and/or the second data source 206b. The data may be retrieved prior to the user-defined XML configuration file being stored on the portal server 104. In some embodiments, the data may be retrieved upon storing the user-defined XML configuration file on the portal server 104. The retrieved data is stored on the SIFT database 204 in a predefined format. Based on the user-defined query, a set of retrieved data, corresponding to one or more of the first data source 206a and the second data source 206b, is extracted from the tables of the SIFT database 204 and presented on the user interface 300 (as shown in FIG. 3) at the portlets corresponding to the results field 324.

If the end-user opts for periodic data retrieval, then data is extracted periodically, via the portal server 104 in conjunction with the first application 208a, from the first data source 206a. Further, if the end-user opts for aperiodic data retrieval, then data is extracted aperiodically, via the portal server 104 in conjunction with the second application 208b, from the second data source 206b. The data is further combined and stored at the SIFT database 204. The combined data is then displayed at the corresponding portlets in the results field 324 as per the first set of options including the user-defined or default time period and as per the second set of options including the event trigger.

In some embodiments, data may be retrieved either periodically or aperiodically based on the choices made at the periodic data retrieval field 326 and the aperiodic data retrieval field 330. Accordingly, the retrieved data is displayed at the results field 324.

Figure 4:
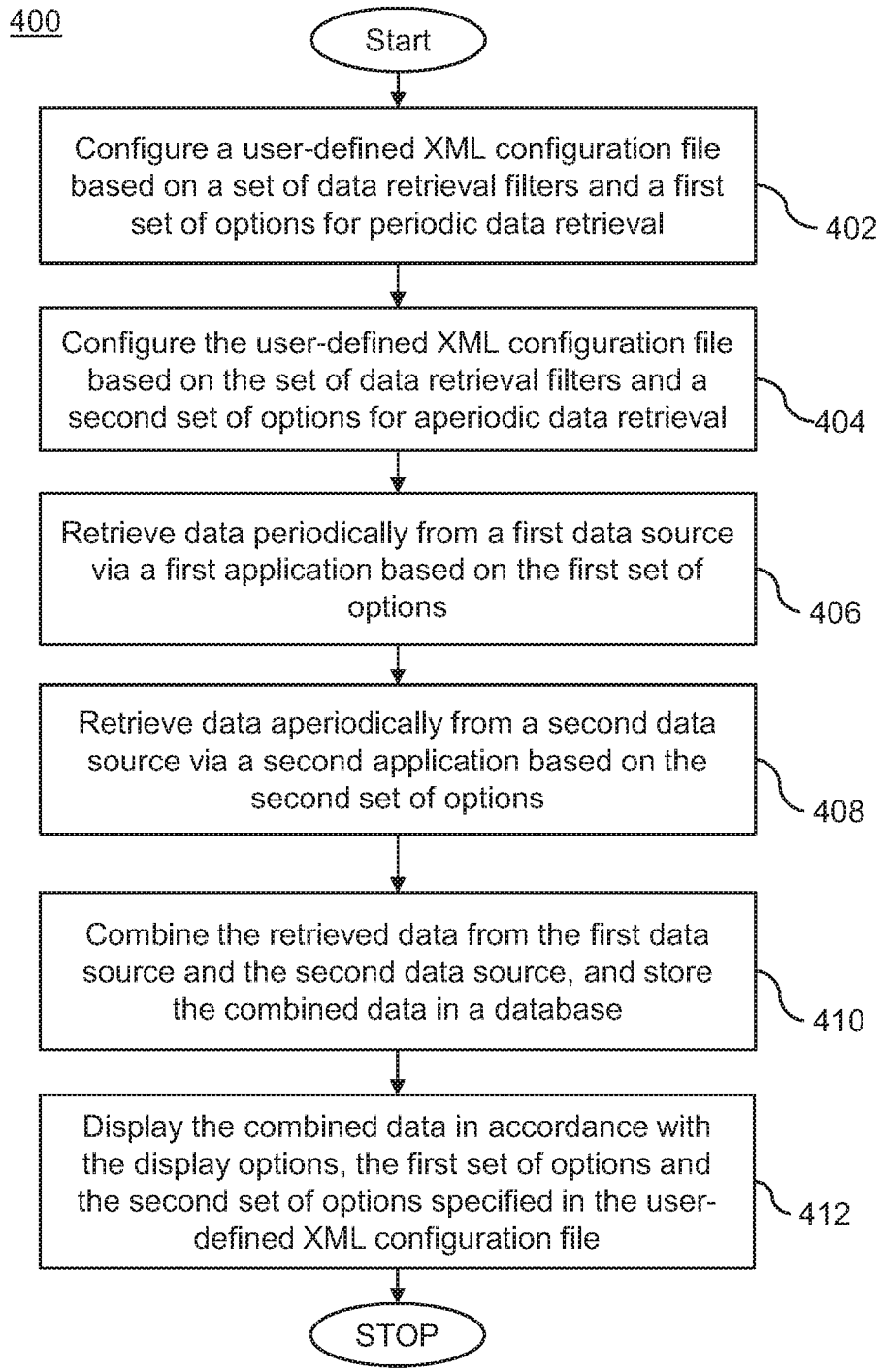
FIG. 4 is a flowchart of an exemplary method for retrieving data in accordance with the disclosed subject matter.

FIG. 4 illustrates a method 400 of exchanging data between the user terminal 108 and any one or a combination of the first data source 206a and the second data source 206b in accordance with the disclosed subject matter. This flowchart is merely provided for exemplary purposes, and embodiments are intended to include or otherwise cover any methods or procedures for data retrieval.

At step 402, a user-defined XML configuration file stored on the portal server 104 is configured to access data from any one or a combination of the first and second data sources 206a, 206b, in accordance with a set of data retrieval filters and a first set of options for periodic data retrieval specified in a data source user query received at the user terminal 108. At step 404, the user-defined XML configuration file stored on the portal server 104 is configured to access data from any one or a combination of the first and second data sources 206a, 206b, in accordance with the set of data retrieval filters and a second set of options for aperiodic data retrieval specified in the data source query. In some embodiments, a processor (not shown) associated with the user terminal 108 generates the user-defined XML configuration file and stores it on a memory (not shown) associated with the user terminal 108. The portal server 104 includes the user-defined XML configuration file, the first application 208a and the second application 208b. The data source may be selected through choices provided at the data source field 314. Choices provided at the fields 302 to 322 and the fields 326 to 332 are embedded in the user-defined XML configuration file.

In some embodiments, the end-user may enable periodic data retrieval by checking the periodic data retrieval field 326 and defining a time period at the time period field 328, thereby providing the first set of options for periodic data retrieval that are stored in the user-defined XML configuration file. Further, in some other embodiments, the end-user may enable aperiodic data retrieval by checking the aperiodic data retrieval field 330, thereby providing the second set of options for aperiodic data retrieval that are stored in the user-defined XML configuration file. The user-defined XML configuration file may be extracted to a database (not shown) on the portal server 104. In some embodiments, the user-defined XML configuration file may also be stored on a memory associated with the user terminal 108 or a removable memory communicably coupled to the user terminal 108.

At step 406, data is retrieved periodically, via the portal server 104 in conjunction with the first application 208a, from the first data source 206a based on the first set of options. The end-user sets a time period for periodic data retrieval at the time period field 328. In the event that a user-defined time period is unavailable, a default time period for the periodic data retrieval is utilized by the first application 208a. Further, based on the default time period, the first set of options are generated and embedded in the user-defined XML configuration file.

At step 408, data is retrieved aperiodically, via the portal server 104 in conjunction with the second application 208b, from the second data source 206b based on the second set of options. The end-user provides an event trigger at the aperiodic data event trigger field 332. Further, the portal server 104 in conjunction with the second application 208b determines whether data source query includes parameters indicative of aperiodic data retrieval. In some embodiments, if a user-defined event trigger is unavailable, the portal server 104 in conjunction with the second application 208b may set the event trigger as a new event or entry at the corresponding data source.

Further, the user can make changes in the data source query to retrieve both periodic as well as aperiodic data in accordance with the display options specified in the XML configuration file.

At step 410, the data retrieved as per steps 406 and 408 is combined, and stored in the SIFT database 204 in accordance with a predefined format. The SIFT database 204 may be located on the portal server 104 or the user terminal 108. The portal server 104 can transform the data retrieved from the first data source 206a and/or the second data source 206b in accordance with the predefined format and populate the tables of the SIFT database 204 with the transformed data. Data retrieved periodically and the data retrieved aperiodically are combined and stored on the SIFT database 204. Further, the predefined format is a presentation format that is implemented in accordance with the display options made available through the XML configuration file and subsequently the form-based user interface 300. Such a format facilitates quick presentation of data on the user terminal 108 as per options provided by the end-user.

At step 412, the portal server 104 displays the combined data using the SIFT web portal 202 in accordance with the set of display options specified in the user-defined XML configuration file. The combined data stored at the SIFT database 204 can be extracted in accordance with at least one option specified in the user-defined XML configuration file and presented on the user interface 300 through the user terminal 108. The combined data can be displayed through the portlets 324a and 324b.

Figure 5:
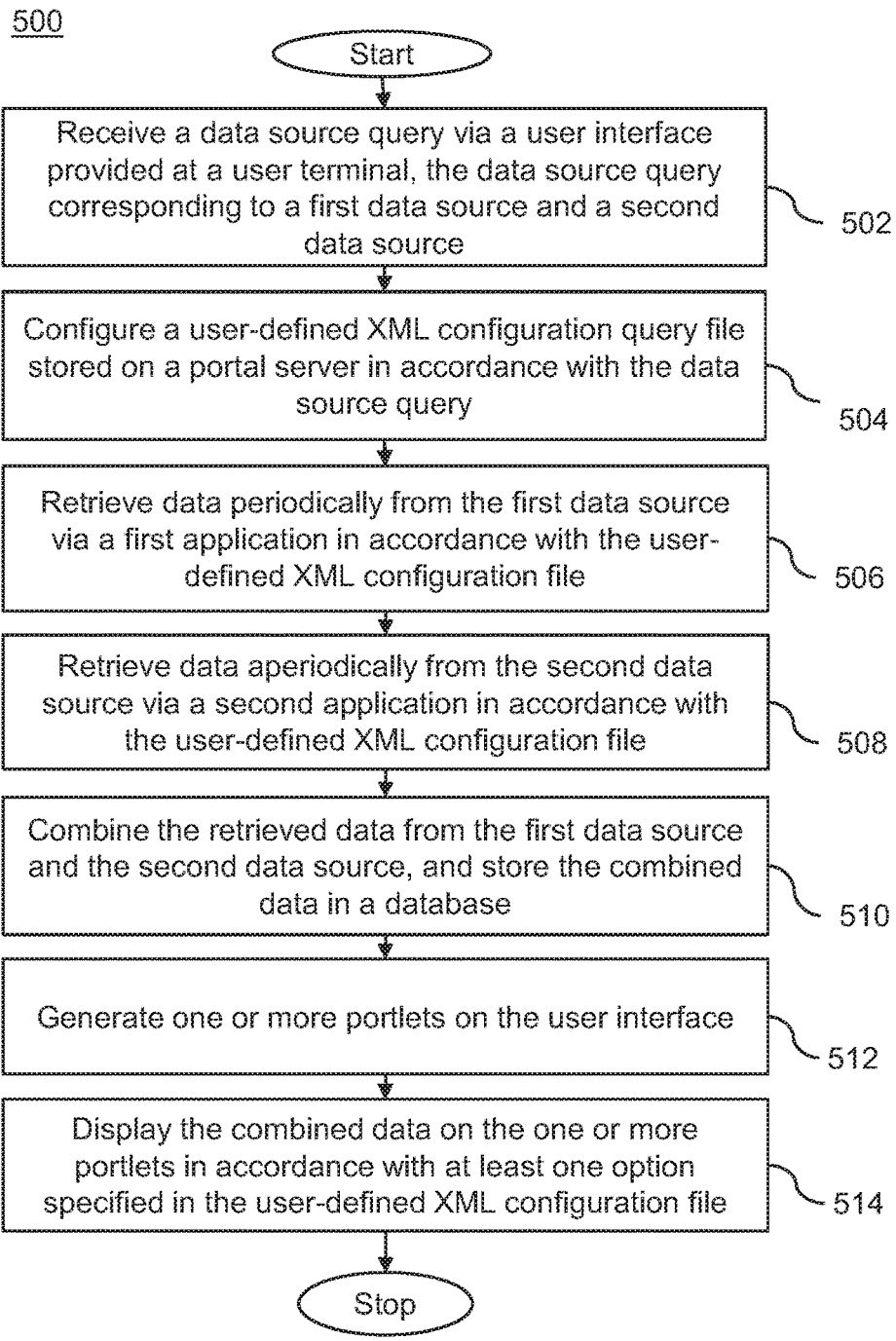
FIG. 5 is a flowchart of an exemplary method for retrieving data in accordance with the disclosed subject matter.

FIG. 5 is a flowchart of a method 500 for retrieving data from one or more data sources in accordance with the disclosed subject matter. At step 502, a data source query, corresponding to the first data source 206a and the second data source 206b, is received through the form-based user interface 300. The data source query can include, but is not limited to, data retrieval filters, a first set of options for periodic data retrieval, a second set of options for aperiodic data retrieval, and/or display options. The data retrieval filters include, but not restricted to, one or more identities indicative of a data source from one or more data sources illustrated in FIG. 2 as the first data source 206a and the second data source 206b. The display options can include, but are not limited to, at least one of a tabular layout, a chart layout, a news layout, a form layout, and a bullet layout. The display options can also include a font and a location on the user interface 300 of the displayed data.

At step 504, a user-defined XML configuration file stored on the portal server 104 is configured in accordance with the data source query. The data retrieval filters, the first set of options, the second set of options and the display options are embedded in the user-defined XML configuration file. In some embodiments, the end-user defines a time period for the retrieval of periodic data, for which the first set of options can be generated. Further, the portal server 104, in conjunction with the second application 208b, receives an event trigger 332 from the user terminal 108, thereby generating the second set of options. Accordingly, the first set of options and the second set of options are embedded in the user-defined XML configuration file.

The method 500 can also include determining whether the data source query includes a periodic parameter (received through the periodic data retrieval field 326) indicative of periodic data retrieval. The periodic parameter may be generated upon checking of the periodic data retrieval field 326 by the end-user. The method 500 can further include generating a default time period based on the periodic parameter, generating a first set of options for periodic data retrieval based on the default time period and embedding the first set of options in the user-defined XML configuration file.

The method 500 can include receiving the user-defined time period from the end-user at the user terminal 108. The method 500 further includes modifying the first set of options for periodic data retrieval based on the user-defined time period, and embedding the modified set of options for periodic data retrieval in the user-defined XML configuration file. In an embodiment, the modified set of options include the user-defined time period instead of the default time period.

The method 500 can also include determining whether the data source query includes an aperiodic parameter (received through the aperiodic data retrieval field 330) indicative of aperiodic data retrieval. The aperiodic parameter may be generated upon checking of the aperiodic data retrieval field 330 by the end-user. The method 500 further includes generating an event trigger based on the aperiodic parameter, generating a second set of options for aperiodic data retrieval based on the event trigger, and storing the second set of options for aperiodic data retrieval in the user-defined XML configuration file.

The user-defined XML configuration file further includes connection information which constitute any one or a combination of IP addresses, subnet masks, domain name server addresses, host name and suffix, execution parameters, system information pertaining to the user terminal 108, the first application 208a, the second application 208b and/or the portal server 104.

The method 500 can include the portal server 104 accessing connection information stored in the user-defined XML configuration file and transmitting the connection information to the first application 208a and the second application 208b such that data can be retrieved from the first and second data sources 206a, 206b.

At step 506, a set of data is retrieved periodically, in accordance with the first set of options, from the first data sources 206a via a periodically executed application, i.e., the first application 208a. Further, at step 508, a set of data is retrieved aperiodically, in accordance with the second set of options, from the second data source 206b via an aperiodically executed application, i.e., the second application 208b.

At step 510, the data retrieved periodically and the data retrieved aperiodically is combined and stored in the SIFT database 204 in a predefined format. The portal server 104 can transform the data retrieved from the data source 206a and/or the data source 206b in accordance with the predefined format and populate the tables of the SIFT database 204 with the transformed data. Further, the predefined format is a presentation format that is implemented in accordance with the display options made available through the XML configuration file and subsequently the form-based user interface 300.

At step 512, the portal server 104 generates the first portlet 324a and the second portlet 324b on the user interface 300. Further, at step 514, the portal server 104 displays the combined data on the first and second portlets 324a, 324b in accordance with the display options specified in the user-defined XML configuration file. In some other embodiments, the generated portlets may lead to a new portal page showing the combined data.

The method 500 can further include retrieving the combined data from the SIFT database 204 in accordance with at least one parameter specified in the user-defined user configuration file. The at least one parameter can include the display options, data retrieval filters, the first set of options, the second set of options and connection information.

The system 200, and the methods 400, 500 are also capable of retrieving and displaying structured data based on a structured query and/or an unstructured query. Data source queries can be based upon the structure of a database or a data source from which data is retrieved. In an embodiment, a data source query formatted in Structured Query Language ("SQL") is referred to as a "structured query". Structured Query Language (SQL) is a computer language for relational database management and data manipulation. An unstructured query can include, but not restricted to, a list of important terms, a natural language question or sentence, and date filters. Upon receiving the unstructured query, the system 200 can identify keywords in the unstructured query, and the query may be parsed to retrieve relevant results from the SIFT database 204 and return the retrieved data to the user terminal 108. Thereafter, the retrieved data may be displayed to the user at the results field 324. In an embodiment, the unstructured query may be expanded to include synonyms and/or related terms of the words provided by an end-user. The structured queries and the unstructured queries may also be used to retrieve data periodically and/or aperiodically.

IV. Other Exemplary Embodiments

Figure 6:
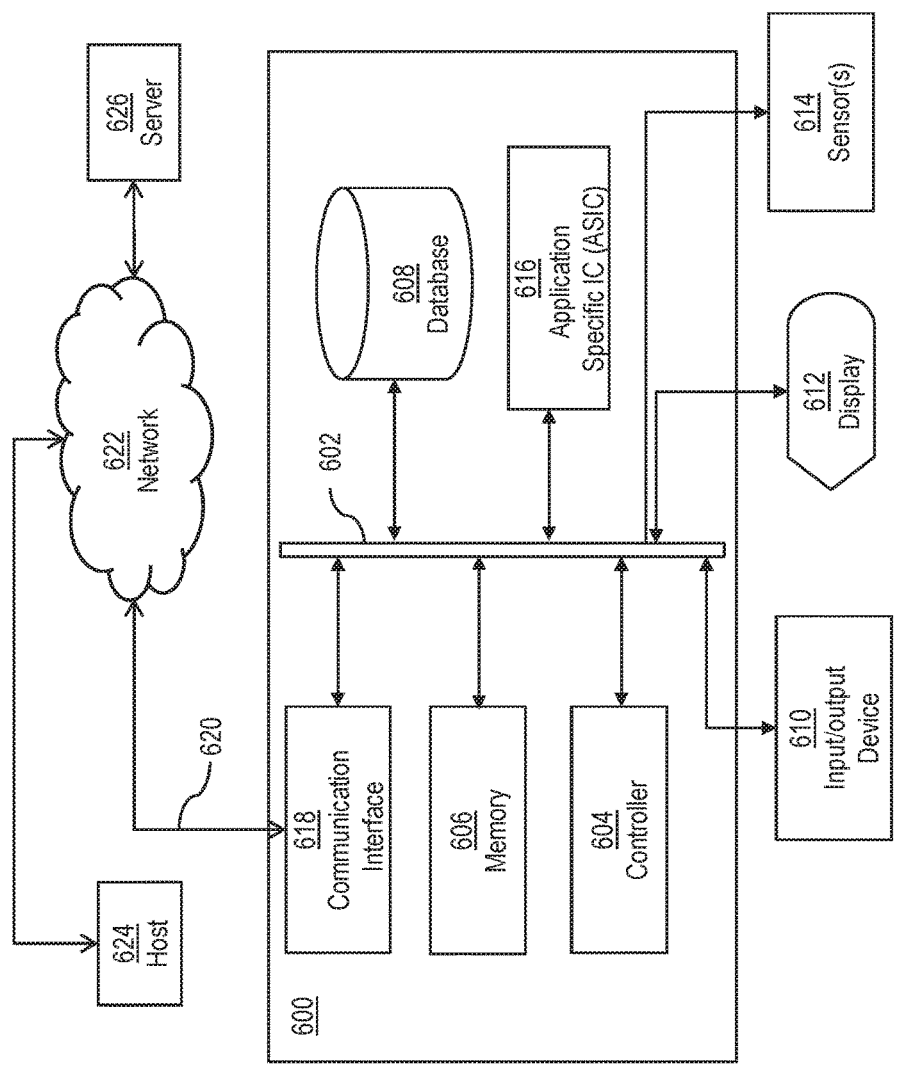
FIG. 6 is a computer system that can be used to implement various exemplary embodiments of the disclosed subject matter.

FIG. 6 illustrates a computer system 600 upon which the operation of the user terminal 108, the SIFT database 204, the portal server 104, the first application 208a and the second application 208b may be implemented. Although, the computer system 600 is depicted with respect to a particular device or equipment, it is contemplated that other devices or equipment (e.g., network elements, servers, etc.) within FIG. 6 can deploy the illustrated hardware and components of system. The computer system 600 is programmed (e.g., via computer program code or instructions) to retrieve data from the data sources 102 and to display the retrieved data on the user terminal 108 described herein and includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic (light, fields, etc.), pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 600, or a portion thereof, constitutes a means for performing one or more steps displaying an output data on the user terminal 108.

A bus 602 includes one or more parallel conductors of information so that information is transferred quickly among devices coupled to the bus 602. A processor 604 for processing information are coupled with the bus 602.

The processor 604 performs a set of operations on information as specified by an end user. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processor 604 may be implemented as mechanical, electrical, magnetic, optical, chemical, or quantum components, among others, alone or in combination.

The computer system 600 also includes a memory 606 coupled to the bus 602. The memory 606, such as a Random Access Memory (RAM) or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system 600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for inspecting the XML data source query files is provided to the bus 602 for use by the controller 604 from an external input/output device 610. From an input perspective, the input/output device could include one or more elements such as a keyboard containing alphanumeric keys operated by a human user, a mouse, trackball, microphone, an Infrared (IR) remote control, a joystick, a game pad, a stylus pen, a touch screen, or any other of an input/output device. These devices can be capable of controlling a position of a small cursor image presented on the display 612 and issuing commands associated with graphical elements presented on the display 612.

From an output perspective, the input/output device 610 could include a Cathode Ray Tube (CRT), a Liquid Crystal Display (LCD), a Light Emitting Diode (LED) display, an organic LED (OLED) display, an active matrix display, an Electrophoretic Display (EPD), a plasma screen, or a printer for presenting text or images. Additionally, a separate display 612 may also include any of the previously mentioned devices or any other devices capable of visually, audibly, or even by means of touch, scent, etc. to provide output data to a user. Further, the display 612 may be a touch enabled display such as capacitive or resistive screen. In some embodiments, for example, in embodiments in which the computer system 600 performs all functions automatically without human input, one or more of the external input device 610, and the display 612 may be omitted.

Sensors 614 may be provided as components of the input/output device 610, or may be provided as independent components to the system 600. The sensor(s) 614 may detect conditions in its vicinity and transform those detections into physical expressions compatible with the measurable phenomenon used to represent information in the computer system 600 such as capturing, recording and causing to store one or more still and/or moving images (e.g., videos, movies, etc.) which also may comprise audio recordings. Sensors 614 may also detect elements such as motion, temperature, imagery or video, etc.

Other external devices can also be coupled to the bus 602 such as an Application Specific IC (ASIC) device 616. In the illustrated embodiment, special purpose hardware such as the ASIC 616 might serve as special purpose hardware configured to perform operations not performed by the controller 604 quickly enough for various purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN) card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. As another example, the communications interface 618 may be a Local Area Network (LAN) card to provide a data communication connection to a compatible LAN, such as Ethernet™ or an Asynchronous Transfer Mode (ATM) network. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the communication network 106 for inspecting the user queries in the user-defined XML configuration files. Further, the communication interface 618 can include peripheral interface devices, such as a thunderbolt interface, a Personal Computer Memory Card International Association (PCMCIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server 626, connected to the Internet, hosts a process that provides a service in response to information received over the Internet. For example, the server 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 604 for execution. For example, instructions and data may initially be carried on a magnetic disk of a remote computer such as the host 624. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 620. An infrared detector serving as the communication interface 618 receives the instructions and data carried in the infrared signal and places information representing the instructions and data onto the bus 602. The bus 602 carries the information to the memory 606 from which the processor 604 retrieves and executes the instructions using some of the data sent with the instructions. The instructions and data received in the memory 606 may optionally be stored on the storage device 608, either before or after execution by the processor 604.

V. Alternative Embodiments

While certain embodiments of the invention are described above, and FIGS. 1 to 6 disclose the best mode for practicing the various inventive aspects, it should be understood that the invention can be embodied and configured in many different ways without departing from the spirit and scope of the invention.

For example, embodiments are disclosed above in the context of retrieving data from one or more data sources based on user queries embedded in XML configuration files. However, embodiments are intended to include or otherwise cover any type of configuration file.

Embodiments as disclosed above allow retrieval of data from different data sources and display the data as per user-defined display options and data retrieval filters through a portal server and an associated portal. Embodiments of the present disclosure further enable the portal server to be a single point of access in data retrieval and display without using any additional resources or applications on an end-user terminal.

Embodiments are also intended to cover storing retrieved data in any predefined format in a database associated with the portal server such that the data can be displayed through portlets generated by the portal server. The predefined format can be based on a type of data source and user-defined data fields provided in an XML configuration file.

Embodiments are also intended to cover accessing data from diverse data sources, and simultaneously allow individualized displays of data for a particular user, a particular search query, or any other level of granularity.

Embodiments are directed to a system and a method that facilitates both periodic and aperiodic data exchange between a user terminal and one or more data sources. A single data source query can be utilized for both periodic data retrieval and aperiodic data retrieval from different data sources. Embodiments also allow an end-user to specify various parameters related to periodic and aperiodic data exchange including, but not limited to, time periods, event triggers, and the like.

Embodiments are also intended to cover any form of language translation technique to translate the retrieved data from one language to another.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary embodiments disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method for exchanging data between a user terminal, and a first data source and a second data source, the method comprising:
   configuring a user-defined XML configuration file stored on a portal server;
   retrieving data periodically from the first data source via a periodically executed application in accordance with connection information specified in the user-defined XML configuration file;
   retrieving data aperiodically from the second data source via an aperiodically executed application in accordance with connection information specified in the user-defined XML configuration file;
   combining data retrieved from the first data source and the second data source;
   storing the combined data in a database; and displaying the combined data on the user terminal in accordance with at least one option specified in the user-defined XML configuration file,
wherein connection information includes IP addresses, subnet masks, domain name server addresses, host name and suffix, execution parameters, and system information pertaining to the user terminal.

2. The method of system 1, further comprising retrieving the combined data from the database in accordance with at least one parameter specified in the user-defined XML configuration file.

3. The method of claim 1, wherein the database is stored on the portal server or the user terminal.

4. The method of claim 1, wherein the user-defined XML configuration file comprises one or more identities indicative of each of the first data source and the second data source, one or more sets of keywords, and a set of display options.

5. The method of claim 4, wherein the combined data is displayed in accordance with the set of display options.

6. The method of claim 1, further comprising:
receiving a user-defined time period at the user terminal;
generating the first set of options for periodic data retrieval based on the user-defined time period; and
storing the first set of options for periodic data retrieval in the user-defined XML configuration file.

7. The method of claim 1, further comprising receiving a data source query through a user interface provided on the user terminal, wherein the data source query corresponds to at least one of the first data source and the second data source.

8. The method of claim 7, further comprising:
determining whether the data source query comprises a periodic parameter indicative of periodic data retrieval;
generating a default time period based on the periodic parameter;
generating a first set of options for periodic data retrieval based on the default time period; and
embedding the first set of options in the user-defined XML configuration file.

9. The method of claim 8, further comprising:
receiving a user-defined time period at the user terminal;
modifying the first set of options for periodic data retrieval based on the user-defined time period; and
embedding the modified first set of options for periodic data retrieval in the user-defined XML configuration file.

10. The method of claim 7, further comprising:
determining whether data source query comprises an aperiodic parameter indicative of aperiodic data retrieval;
generating an event trigger based on the aperiodic parameter;
generating a second set of options for aperiodic data retrieval based on the event trigger; and
storing the second set of options for aperiodic data retrieval in the user-defined XML configuration file.

11. The method of claim 1, further comprising accessing connection information stored in the user-defined XML configuration file to retrieve data from the first data source and the second data source.

12. The method of claim 1, further comprising:
generating one or more portlets on a user interface provided on the user terminal; and
displaying the combined data on the one or more portlets.

13. A method for exchanging data between a user terminal, and a first data source and a second data source, the method comprising:
receiving a data source query through a user interface provided on the user terminal, the data source query corresponding to the first data source and the second data source;
configuring a user-defined XML configuration file stored on a portal server in accordance with the data source query;
retrieving data periodically from the first data source via a periodically executed application in accordance with connection information specified in the user-defined XML configuration file;
retrieving data aperiodically from the second data source via an aperiodically executed application in accordance with connection information specified in the user-defined XML configuration file;
combining data retrieved from the first data source and the second data source;
storing the combined data in a database;
generating one or more portlets on the user interface; and
displaying the combined data on the one or more portlets in accordance with at least one option specified in the user-defined XML configuration file,
wherein connection information includes IP addresses, subnet masks, domain name server addresses, host name and suffix, execution parameters, and system information pertaining to the user terminal.

14. The method of claim 13, further comprising:
determining whether the data source query comprises a periodic parameter indicative of periodic data retrieval;
generating a default time period based on the periodic parameter;
generating a first set of options for periodic data retrieval based on the default time period; and
embedding the first set of options in the user-defined XML configuration file.

15. The method of claim 14, further comprising:
receiving a user-defined time period at the user terminal;
modifying the first set of options for periodic data retrieval based on the user-defined time period; and
embedding the modified first set of options for periodic data retrieval in the user-defined XML configuration file.

16. The method of claim 13, further comprising:
determining whether data source query comprises an aperiodic parameter indicative of aperiodic data retrieval;
generating an event trigger based on the aperiodic parameter;
generating a second set of options for aperiodic data retrieval based on the event trigger; and
storing the second set of options for aperiodic data retrieval in the user-defined XML configuration file.

17. The method of claim 13, wherein the user-defined XML configuration file comprises one or more identities indicative of each of the first data source and the second data source, one or more sets of keywords, and a set of display options.

18. The method of claim 17, wherein the combined data is displayed in accordance with the set of display options.

19. A system for exchanging data between a user terminal, and a first data source and a second data source, the system comprising:
a user interface that is configured to receive a data source query from the user terminal, the data source query corresponding to the first data source and the second data source;

a processor that is configured to generate a user-defined XML configuration file based on the data source query, the user-defined XML configuration file comprising a first set of options for periodic data retrieval and a second set of options for aperiodic data retrieval; and a portal server communicably coupled to the user interface, the portal server configured to:

access the user-defined XML configuration file;

retrieve data from the first data source via a periodically executed application in accordance with the first set of options in accordance with connection information specified in the user-defined XML configuration file;

retrieve data from the second data source via an aperiodically executed application in accordance with the second set of options in accordance with connection information specified in the user-defined XML configuration file;

combining data retrieved from the first data source and the second data source;

storing the combined data in a database;

generating one or more portlets on the user interface; and display the combined data on the user interface in accordance with at least one option specified in the user-defined XML configuration file, wherein connection information includes IP addresses, subnet masks, domain name server addresses, host name and suffix, execution parameters, and system information pertaining to the user terminal.

20. The system of claim 19, wherein the portal server is further configured to access connection information stored in the user-defined XML configuration file to retrieve data from the first data source and the second data source.

* * * * *